(12) United States Patent
Makovec et al.

(10) Patent No.: US 9,394,143 B2
(45) Date of Patent: Jul. 19, 2016

(54) CONVEYING CHAIN SPROCKET AND/OR DEFLECTION CHAIN SPROCKET HAVING AN INCREASED SERVICE LIFE

(71) Applicant: Inventio AG, Hergiswil (CH)

(72) Inventors: Christoph Makovec, Wiener Neustadt (AT); Michael Matheisl, Vösendorf (AT); Robert Schulz, Vienna (AT); Thomas Illedits, Neufeld (AT); Uwe Hauer, Nienburg (DE)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 14/649,970

(22) PCT Filed: Dec. 2, 2013

(86) PCT No.: PCT/EP2013/075245
§ 371 (c)(1),
(2) Date: Jun. 5, 2015

(87) PCT Pub. No.: WO2014/086716
PCT Pub. Date: Jun. 12, 2014

(65) Prior Publication Data
US 2015/0344269 A1    Dec. 3, 2015

(30) Foreign Application Priority Data

Dec. 7, 2012    (EP) .................................... 12195985

(51) Int. Cl.
| | | |
|---|---|---|
| B65G 23/02 | (2006.01) | |
| B66B 23/02 | (2006.01) | |
| B66B 21/04 | (2006.01) | |
| B66B 21/10 | (2006.01) | |
| B66B 23/12 | (2006.01) | |
| B66B 23/10 | (2006.01) | |
| B65G 21/22 | (2006.01) | |

(52) U.S. Cl.
CPC ............... *B66B 23/022* (2013.01); *B66B 21/04* (2013.01); *B66B 21/10* (2013.01); *B66B 23/024* (2013.01); *B66B 23/026* (2013.01); *B66B 23/10* (2013.01); *B66B 23/12* (2013.01); *B65G 21/22* (2013.01)

(58) Field of Classification Search
CPC ...... B66B 23/02; B66B 23/022; B66B 23/026
USPC .......................................................... 198/330
See application file for complete search history.

(56) References Cited

U.S. PATENT DOCUMENTS

| | | | |
|---|---|---|---|
| 5,306,212 A | | 4/1994 | Eberle |
| 5,819,910 A | * | 10/1998 | Langer .................... B66B 23/02 198/330 |
| 6,834,754 B2 | * | 12/2004 | Pietz ..................... B66B 23/026 198/330 |
| 2005/0061609 A1 | * | 3/2005 | Pietz ....................... B66B 25/00 198/330 |
| 2008/0017475 A1 | * | 1/2008 | Illedits .................. B66B 23/022 198/330 |
| 2009/0308712 A1 | * | 12/2009 | Grobbel ................ B66B 23/026 198/330 |

FOREIGN PATENT DOCUMENTS

| | | | | |
|---|---|---|---|---|
| EP | 1876135 | * | 6/2007 | .................... 198/330 |
| GB | 696 624 A | | 9/1953 | |

* cited by examiner

*Primary Examiner* — James R Bidwell
(74) *Attorney, Agent, or Firm* — Ladas & Parry LLP (57) ABSTRACT

The invention relates to an escalator with a step belt or to a moving walkway with a plate belt. The step belt or plate belt has a link chain which contains engagement points arranged in succession at theoretically equal engagement spacings. The escalator or moving walkway has a first deflecting region and a second deflecting region with chainwheels. The link chain is arranged to circulate between the deflecting regions and the engagement points engage in tooth gaps of the chainwheels. The chainwheels have a pitch circle with a pitch which is referred to the tooth gaps and corresponds with half an engagement spacing of the link chain.

15 Claims, 5 Drawing Sheets

CONVEYING CHAIN SPROCKET AND/OR DEFLECTION CHAIN SPROCKET HAVING AN INCREASED SERVICE LIFE

The invention relates to an escalator with a step belt or a moving walkway with a plate belt. The step belt or plate belt includes at least one link chain at which steps or plates are arranged.

Escalators and moving walkways are exposed to high, changing loads due to strongly fluctuating numbers of users and have long operating times of 10 to 18 hours per day. In buildings with public traffic, such as, for example, airports, railway stations or underground stations, escalators and moving walkways can even be in constant use around the clock. Accordingly, the moved parts of these items of transport equipment are subject to a high level of wear and therefore have to be serviced intensively and thoroughly. The parts with strong wear (wear parts) which periodically have to be replaced are, in particular, the plate belt or the step belt as well as the conveying chainwheels and deflecting chainwheels. A conveying chainwheel drives the link chain and a deflecting chainwheel serves for deflecting the link chain strands depending on the respective running direction of the step belt or plate belt from a forward run to a return run or from the return run to the forward run. Recently, the link chain has quite long chain straps so that the number of link locations subject to wear can be reduced to an essential minimum. The link location spacing between two link locations preferably corresponds with the plate depth or the step depth. Each additional link location means even higher production costs of the link chain or conveying chain and requires a higher number of connecting elements such as, for example, chain pins or entrainer axles and guide elements such as, for example, chain rollers.

Whereas the plate belt or step belt can be exchanged quite simply, exchange of the conveying chainwheels and deflecting chainwheels requires a very high expenditure of work, which leads to lengthy shutdown of the transport equipment concerned.

In recent years many escalators and moving walkways of flat construction have been developed. These have many advantages in terms of constructional engineering for customers. For example, in the case of moving walkways with low constructional heights it is possible to dispense with a hole in the floor. Escalators with low constructional heights can be installed more simply in existing buildings, since the available constructional space of the removed, old escalator is usually sufficient. In a given case the support structure of the escalator to be replaced can be left and the new escalator inserted into the old support structure or framework.

In order to construct an escalator of flat construction or a moving walkway of flat construction it is necessary, in particular, to reduce the diameters of the conveying chainwheel and the deflecting chainwheel. This leads to a large deflection of the chain elements or chain straps of the link chain in the region of the deflecting chainwheel or conveying chainwheel. Moreover, with the same pitch, but with decreasing pitch circle diameter of the chainwheel and thus with decreasing tooth number the so-called polygon effect, i.e. a non-uniform movement of the step belt or plate belt, increases. Different measures for elimination of polygon effect are disclosed in, for example, EP 1 876 135 B1.

These measures enable use of lengthy chain straps or chain elements together with small deflecting chainwheels and conveying chainwheels without polygon effect occurring or this, at least, being barely detectable by the users. However, the long link location spacings additionally enlarge the deflection angle at the link locations and in the case of a given pitch circle diameter less teeth are in engagement with the link chain at the circumference of the chainwheel, as a result of which the area pressure at the tooth bases and tooth flanks of the deflecting chainwheel or conveying chainwheel and thus the wear thereof are substantially higher than in the case of chainwheels with the same pitch and larger pitch circle diameter.

It is therefore an object of the present invention to create a moving walkway or an escalator, the conveying chainwheel and/or deflecting chainwheel of which has or have a substantially longer service life than the known chainwheels with comparable dimensions.

This object is fulfilled by an escalator with a step belt or a moving walkway with a plate belt, wherein the step belt or plate belt has at least one link chain which contains engagement points arranged in succession at theoretically equal engagement spacings. Theoretical because due to production tolerances and due to wear the engagement spacings can significantly vary within a permissible range. Steps or plates are arranged at the link chain. The escalator or moving walkway additionally has a first deflecting region and a second deflecting region with at least one conveying chainwheel, wherein the conveying chainwheel deflects and drives the link chain. The first deflecting region can have either at least one deflecting chainwheel or at least one deflecting curve for deflecting the link chain. The at least one link chain is arranged to circulate between the deflecting regions, wherein the engagement points engage in tooth gaps of the conveying chainwheel and in a given case in tooth gaps of at least one deflecting chainwheel arranged in the first deflecting region.

In order to increase service life, the at least one conveying chainwheel and/or the at least one deflecting chainwheel has or have a pitch circle with a pitch which, referred to the tooth gaps, corresponds with half an engagement spacing. Due to the relationship of the pitch of the conveying chainwheel and/or of the deflecting chainwheel corresponding with half the engagement spacing always only each second tooth gap is occupied by an engagement point in the deflecting region. As explained further below in more detail, the service life of the chainwheels can thereby be almost doubled.

The engagement points can be of very different design. For example, the link locations of the at least one link chain form the engagement points.

Chain rollers serving as engagement points can also be arranged at the at least one link chain. The chain rollers have a specific chain roller width which corresponds at least with a length of a contact line between the chainwheel and the chain roller during the engagement. The length of the contact line is so selected that an allowable area pressure of the chain roller material or the deflecting and/or conveying chainwheel material is not exceeded. These chain rollers are preferably arranged at the link locations of the link chain. In that case, however, not each link location has to be provided with a chain roller.

In a first embodiment of invention the characteristic features of the link chains, roller chains or conveying chains used in escalators and moving walkways are exploited. A characteristic feature consists in that the link chains due to the plate or step length or plate or step depth have long chain straps or chain elements by comparison with commercially typical roller chains. Instead of using chainwheels with very thick teeth matched to the length of the chain elements the present invention proposes use of chainwheels with almost twice the number of teeth. For preference, the at least one conveying chainwheel and/or deflecting chainwheel has or have an uneven number of teeth. The uneven number of teeth ensures that after two revolutions of the conveying chainwheel or of the deflecting chainwheel all tooth gaps have been occupied once. Since each tooth gap can come into engagement with engagement points, the engagement points of the link chain do not have to be offset relative to the deflecting chainwheel and/or conveying chainwheel. An even number of teeth would obviously also be possible, but then when half the service life of the conveying chainwheel or of the deflecting chainwheel is reached the deflecting chain would have to be displaced by one pitch of the conveying chainwheel and/or of the deflecting chainwheel so that during the second half of the service life the tooth gaps still unused up to then are occupied.

The second embodiment of the invention follows the teaching disclosed in EP 1 876 135 B1 and is particularly suitable for moving walkways and escalators with very low constructional height. In this embodiment the chain rollers, which serve as engagement points, of the at least one link chain are divided into first chain rollers and second chain rollers. In addition, the first chain rollers are arranged at the link chain to be offset relative to the second chain rollers so that the first chain rollers and the second chain rollers roll on tracks adjacent to one another. The conveying chainwheel or the deflecting chainwheel has the width of one track and is aligned with, for example, the first track. Due to the offset arrangement of the chain rollers long engagement spacings between the chain rollers are present, which in the manner according to the invention enable arrangement of further tooth gaps at the chainwheel which can be all occupied as a consequence of the uneven number of teeth.

As proposed in EP 1 876 135 B1, for example, the first chain rollers are guided by way of the conveying chainwheel and the deflecting chainwheel and the second chain rollers by way of a deflecting curve aligned with the conveying chainwheel or deflecting chainwheel. In order eliminate the so-called polygon effect, the chain rollers can bear, in the respective deflecting region, against a base circle of the conveying chainwheel or of the deflecting chainwheel, wherein the base circle radius is smaller than the radius of the deflecting curve.

A second chainwheel can also be used instead of the deflecting curve. The first chain rollers are then guided by way of a first conveying chainwheel and the second chain rollers by way of a second conveying chainwheel arranged parallel to the first conveying chainwheel and connected therewith to be secure against relative rotation. In the opposite deflecting region, if deflecting chainwheels are provided there, the first chain rollers are guided by way of a first deflecting chainwheel and the second chain rollers are guided by way of a second deflecting chainwheel arranged parallel to the first deflecting chainwheel and connected therewith to be secure against relative rotation. Insofar as the conveying chainwheels or deflecting chainwheels have the same pitch circle diameters, polygon effect is present. If, however, the first conveying chainwheel and the first deflecting chainwheel have a larger pitch circle diameter than the second conveying chainwheel and the second deflecting chainwheel then in accordance with the teaching of EP 1 876 135 B1 the polygon effect can be at least significantly reduced.

Instead of arranging the chain rollers to be offset at the link chain, these can be constructed to be stepped. This means that the chain rollers have a first roller diameter in the first half of their chain roller width and a second roller diameter, which is smaller with respect to the first roller diameter, in the second half of their chain roller width. These chain rollers can be arranged with their stepped form alternating between chain straps of the link chain so that a first part of the chain rollers and a second part of the chain rollers roll by the first roller diameters thereof on tracks or paths adjacent to one another.

These link chains with chain rollers of stepped form can equally be used in escalators and moving walkways, the conveying chainwheel and deflecting chainwheel of which have a base circle radius, wherein the width of the conveying chainwheel and of the deflecting chainwheel corresponds with half the chain roller width of the stepped chain rollers. The conveying chainwheel and the deflecting chainwheel are aligned with one of the two tracks adjacent to one another. In addition, a respective deflecting curve aligned with the conveying chainwheel or deflecting chainwheel and with the second track is present, so that in the deflecting regions the first roller diameters lie in alternation at the base circle diameter or against the deflecting curve. However, the stepped chain rollers protruding into the tooth gaps of the chainwheel never lie by the second roller diameter thereof at the base circle radius and accordingly do not constitute engagement points in the sense of the invention.

In addition, in the case of the stepped rollers the conveying chainwheel and the deflecting chainwheel can have a base circle radius which is smaller than the radius of the deflecting curve.

A further embodiment of a link chain again provides chain rollers of stepped form, which have a first roller diameter in the first half of their chain roller width and a second roller diameter, which is smaller relative to the first roller diameter, in the second half of their chain roller width. The chain rollers, also in the case of this embodiment, are arranged with their stepped form alternating between chain straps of the link chain and are thereby divided into a first part and a second part of chain rollers. By contrast to the embodiment described beforehand, the first part of chain rollers and the second part of chain rollers roll by the first roller diameters thereof on a common, centre track. However, the first part of the chain rollers is aligned with respect to its second diameter with a first side track extending parallel to the centre track and the second part of the chain rollers is aligned with respect to its second diameter with a second side track extending parallel to the centre track.

The conveying chainwheel and, insofar as present, the deflecting chainwheel of this embodiment have a base circle radius and the width of the conveying chainwheel and the deflecting chainwheel correspond with half the chain roller width of the stepped chain rollers. These are aligned with one of the two side tracks. In addition, a respective deflecting curve aligned with the conveying chainwheel or deflecting chainwheel and with the centre track is present so that in the deflecting regions the first roller diameters lie at the deflecting curve and the second diameters lie at a side track at the base circle radius.

A development of this embodiment consists in that the first part of the chain rollers is guided by the second diameters thereof by way of a first conveying chainwheel, which is aligned with one of the two side tracks, and a first deflecting chainwheel. The second part of the chain rollers is guided by its second diameters by way of a second conveying chainwheel, which is aligned with the second side track and which is arranged parallel to the first conveying chainwheel and connected therewith to be secure against relative rotation, as well as by way of a second deflecting chainwheel, which is arranged parallel to the first deflecting chainwheel and connected therewith to be secure against relative rotation. In addition, in the deflecting region both the first part and the second part of the chain rollers roll by the first diameter thereof over a deflecting curve arranged between the conveying chainwheels or deflecting chainwheels. This deflecting curve can be interrupted in its length so that in this deflecting length section the chain rollers are in contact only by the second diameters thereof with the two conveying chainwheels or the two deflecting chainwheels.

Following the teaching of EP 1 876 135 B1 the first conveying chainwheel and the first deflecting chainwheel can have a larger pitch circle diameter than the second conveying chainwheel and the second deflecting chainwheel. In that case the deflecting curve arranged between the first deflecting chainwheel or conveying chainwheel and the second deflecting chainwheel or conveying chainwheel serves merely for introduction of the chain rollers into the first and second deflecting chainwheels or into the first and second conveying chainwheels so as to completely eliminate polygon effect.

The escalator or the moving walkway with at least one conveying chainwheel and/or deflecting chainwheel with increased service life is explained in more detail in the following by way of embodiments and with reference to the drawings, in which.

BRIEF DESCRIPTION OF THE DRAWINGS

DETAILED DESCRIPTION OF THE INVENTION

Figure 1:
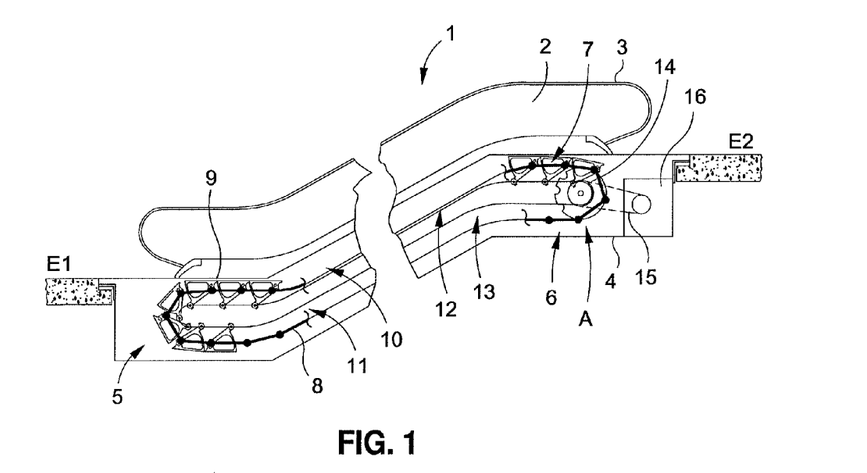
FIG. 1 shows, in side view in schematic illustration, an escalator which has a circulating step belt which is arranged between a first deflecting region and a second deflecting region.

FIG. 1 shows schematically in side view an escalator 1 with a balustrade 2 and with a handrail 3 encircling the balustrade 2. The escalator 1 connects a lower storey E1 with an upper storey E2, wherein a support structure 4, which is formed as a framework, serves as support for the balustrade 2 and as installation frame for further components of the escalator 1. The supporting structure 4 additionally has a further first deflecting region 5 and a second deflecting region 6. A step belt 7 is arranged in the supporting structure 4 between the first deflecting region 5 and the second deflecting region 6 to circulate. The step belt 7 comprises at least one link chain 8, which is illustrated only partly in FIG. 1 and at which steps 9 are arranged. The step belt 7 has a forward run 10, by means of which persons and objects are transported, and a return run 11, which serves for return guidance of the steps 9. The steps 9 and the link chain 8 are guided in the forward run 10 by means of guide rails 12 and in the return run 11 by means of guide rails 13.

For deflecting the step belt 7, arranged in the first deflecting region 5 is at least one deflecting chainwheel or deflecting guide, which, for reasons of clarity, is here illustrated only schematically. Arranged in the second deflecting region 6 is a conveying chainwheel 14, which is connected with a drive motor 16 by means of a drive train 15. The conveying chainwheel 14 engages in the link chain 8 and transmits, by mechanically positive couple, rotational movement of the drive motor 16 to the link chain 8 and thus to the step belt 7.

Figure 2:
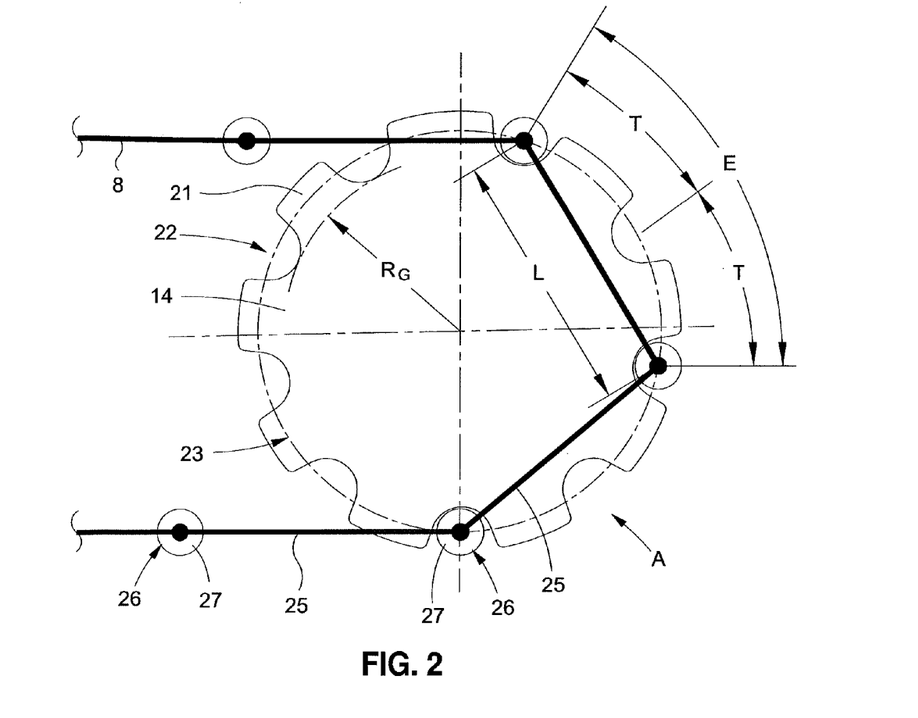
FIG. 2 shows, in side view in schematic illustration, a conveying chainwheel of the second deflecting region illustrated in FIG. 1 as well as a part of a link chain of the step belt.

The detail view A of FIG. 1 is illustrated in FIG. 2 to larger scale and shows the basic principle of the invention. The conveying chainwheel 14 has an uneven number of teeth 21 and tooth gaps 22. These are arranged, with reference to a pitch circle diameter 23, with the same pitch T at the circumference of the conveying chainwheel 14.

For the sake of better clarity the link chain 8 is schematically illustrated and includes chain straps 25, link locations 26 and engagement points 27, the engagement points being arranged in the region of the link locations 26. These engagement points 27 can be chain rollers, chain pins, chain sleeves, slide elements such as cages or blocks, and the like. In the illustrated embodiment the engagement points 27 lie in the tooth gaps 22 at a base circle radius $R_G$, wherein the pivot axes, which are arranged orthogonally to the plane of the drawing, of the link locations 26 lie on the pitch circle diameter 23.

The engagement points 27 could, for example, also be arranged in the middle between two link locations 26 at the chain strap 25. The engagement points 27 are arranged or constructed in succession at theoretically equal engagement spacings E at the link chain 8. As illustrated clearly in FIG. 2, this engagement spacing E is not the length L of a chain strap 25, but the curved dimension at the pitch circle diameter 23 of the conveying chainwheel 14 and corresponds with twice the pitch T at the pitch circle diameter 23. However, in the present example the length L of the chain strap 25 corresponds with the engagement spacing E in the manner that the length L of the chain strap 25 corresponds with the chord of a pitch circle section of the conveying chainwheel 14, which pitch circle section is defined by the engagement spacing E.

If now the conveying chainwheel 14 rotates, always only each second tooth gap 22 enters into contact or operative connection with successive engagement points 27 in the region of the conveying chain 14 looped around by the link chain 8. However, due to the uneven number of teeth, during two revolutions of the conveying chainwheel 14 all tooth gaps 22 enter into contact with engagement points 27. The same explanations obviously also apply to a deflecting chainwheel.

Figure 3:
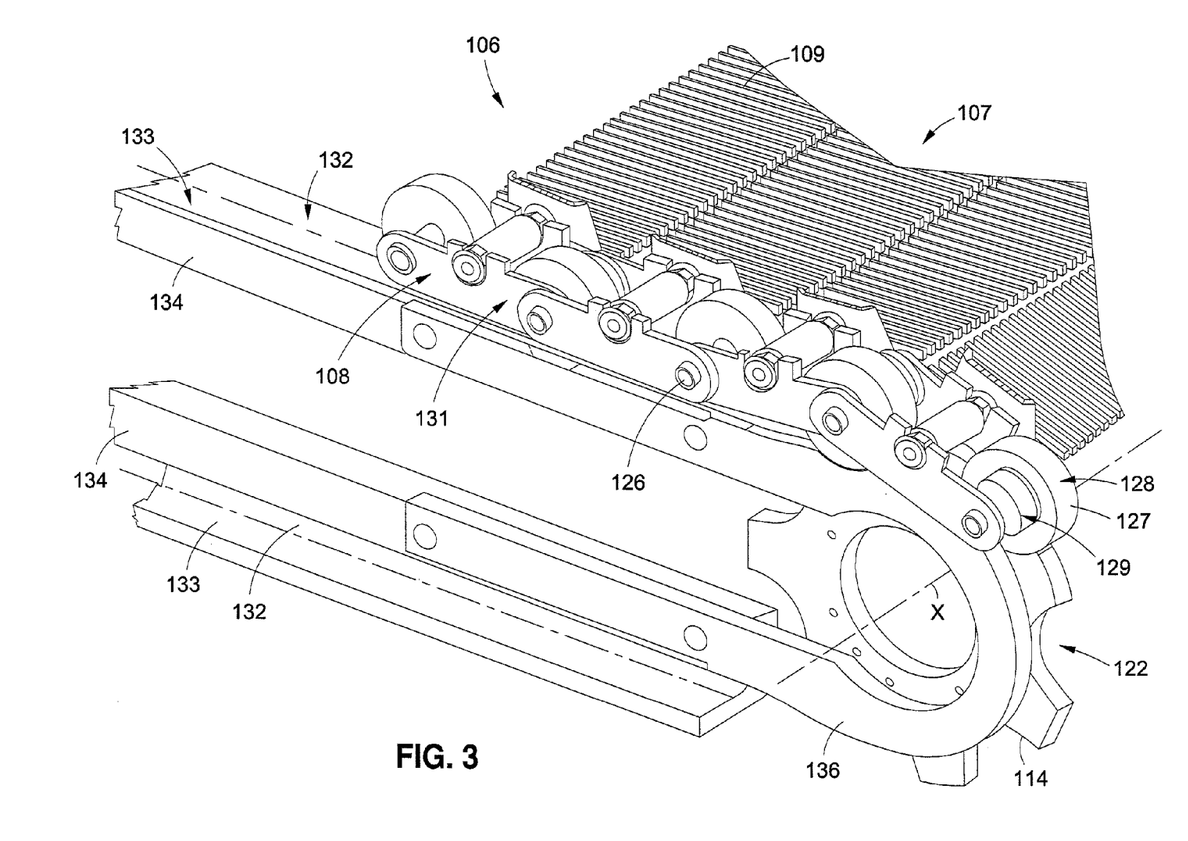
FIG. 3 shows, in three-dimensional view, a deflecting region of a moving walkway with a conveying chainwheel, a deflecting curve and a link chain in a first embodiment, which has stepped chain rollers.

FIG. 3 shows in three-dimensional view a deflecting region 106 of a moving walkway (not illustrated in more detail) with a plate belt 107. The plate belt 107 is constructed substantially the same as a step belt, wherein a plurality of plates 109 is arranged at at least one link chain 108 instead of steps. The link chain 108 has a plurality of chain straps 131, which are connected together by link locations 126. A chain roller 127 is arranged between the chain straps 131 at each link location 126, wherein, as described in the following, each second chain roller 127 serves as an engagement point 127. The chain rollers 127 of the at least one link chain 108 are of stepped construction. They accordingly have a first roller diameter 128 in the first half of their chain roller width and a second roller diameter 129, which is smaller with respect to the first roller diameter 128, in the second half of their chain roller width. The chain rollers 127 are arranged with their stepped form alternating between the chain straps 131 so that a first part of the chain rollers 127 rolls on a first track 132 of a rail 134 and a second part of the chain rollers 127 rolls by its first roller diameter 128 on a second track 133 of the rail 134.

A conveying chainwheel 114 is arranged in the deflecting region 106 to be rotatable about an axis X of rotation, wherein for the sake of better clarity illustration of the shaft and the bearing points was dispensed with. The conveying chainwheel 114 is aligned with the first track 132 and has almost the track width thereof. A deflecting curve 136 is fastened to the rail 134 near the conveying chainwheel 114 and in alignment with the second track 133. The curve centre point of the deflecting curve 136 is aligned precisely with the axis X of rotation of the conveying chainwheel 114. Although the pitch of the chainwheel 114 corresponds with the spacings of the link locations 126, due to its stepped roller diameter 128, 129 and the alternating arrangement only the first chain rollers 127, which serve as engagement points 127, engage by their first roller diameter 128 in a tooth gap 122 of the conveying chainwheel 114. The second chain rollers 127 roll by their first roller diameters 128 over the deflecting curve 136, whereby the second roller diameters 129 thereof remain spaced from the chainwheel 114 in the entire deflecting region. It is evident from these explanations that only the first chain rollers 127 are engagement points 127 in the sense of the invention. The teaching disclosed in FIG. 3 obviously also applies to a deflecting chainwheel (not illustrated).

The roller body of the chain roller 127 can be made from several materials, so that, for example, a first half with the first roller diameter 128 is made of plastics material and the second half with the small roller diameter 129 is made of metal, for example steel. Obviously, other materials such as aluminium, bronze, glassfibre-reinforced, aramide-fibre-reinforced and carbonfibre-reinforced synthetic materials are also usable for producing roller bodies and their properties can be appropriately combined with one another. In addition, two roller bodies, which are arranged adjacent to one another, of different roller diameters 128, 129 can be used instead of a stepped roller body. The two roller bodies arranged adjacent to one another do not have to be connected together to be secure against relative rotation. The chain rollers can obviously also be constructed in correspondence with FIG. 4, which is described in the following.

Figure 4:
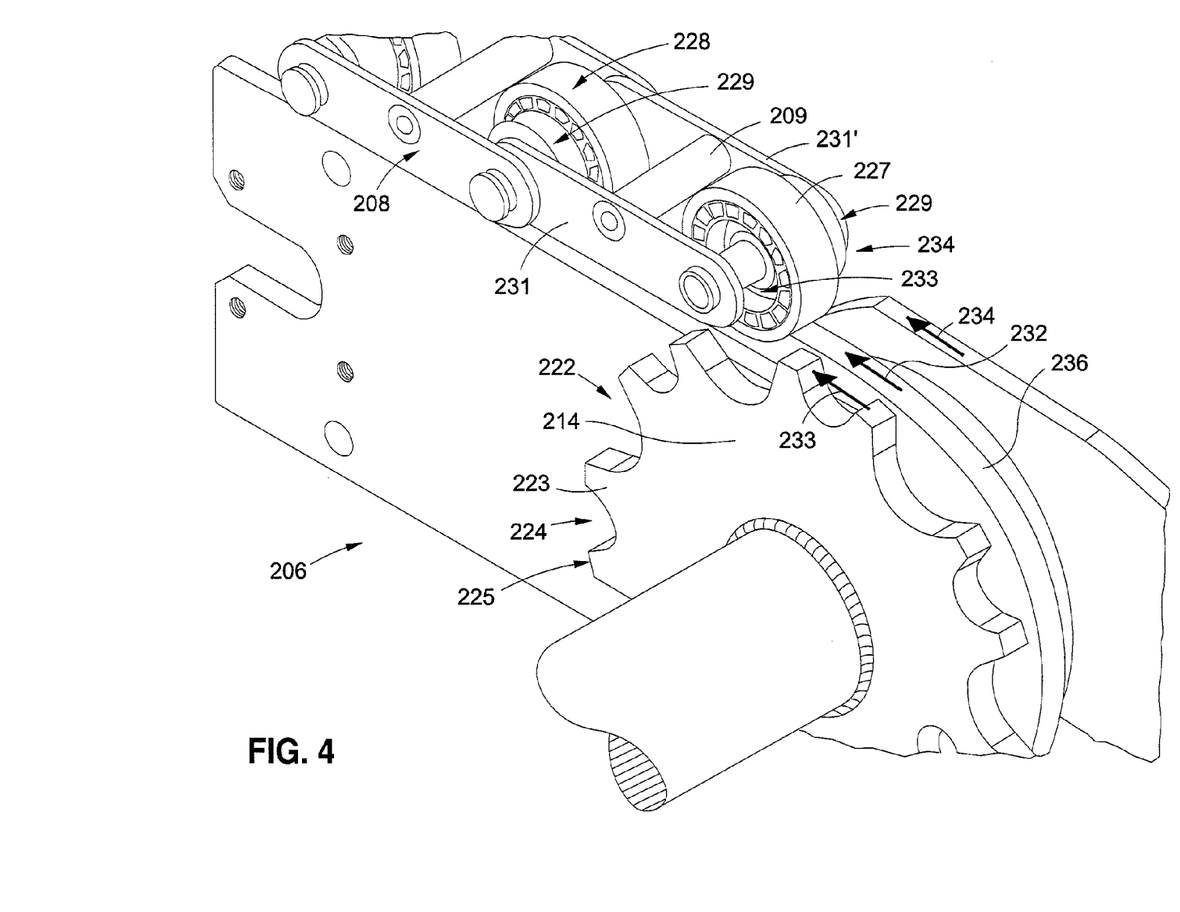
FIG. 4 shows, in three-dimensional view, a deflecting region of a moving walkway with a conveying chainwheel, a deflecting curve and a link chain in a second embodiment, which has stepped chain rollers.

The deflecting region 206 illustrated in FIG. 4 shows a further possibility of arranging stepped chain rollers 227 at a link chain 208. The stepped chain rollers 227 described in the foregoing in connection with FIG. 3 can also be so arranged that the first roller diameters 228 thereof are arranged on a middle track 232 and this middle track 232 is aligned with a deflecting curve 236, so that all chain rollers 227 roll by the larger roller diameter 228 thereof over the deflecting curve 236. The second halves of the chain rollers 227 with smaller roller diameters 229 are arranged in alternation on one side and the other side of the first roller diameter 228.

Through the alternating arrangement three tracks 232, 233, 234, so to speak, are present, namely the middle track 232, a first side track 233 and a second side track 234. A conveying chainwheel 214 is arranged laterally of the deflecting curve 236 and aligned with one of the two side tracks 233, 234 extending parallel to the centre track 232. Thus, only each second chain roller 227 comes by its second half, which has a small roller diameter 229, into engagement with the conveying chainwheel 214. Only these chain rollers 227 serve as engagement points 227. Since the conveying chainwheel 214 has a pitch corresponding with a link spacing or the chain pitch of the link chain 208 each second chain gap 222 at the looped-around circumference of the conveying chainwheel 214 remains unoccupied. Due to the uneven number of teeth each tooth gap 222 comes, within two revolutions, into engagement or into operative connection with an engagement point 227 of the link chain 208 once.

It is additionally to be noted that the conveying chainwheel 214 has a plurality of teeth 223 which each have a recess 224 at the tooth tip 225 thereof. These recesses 224 are free places for connecting pins 209 of the link chain 208. These connecting pins 209 connect chain straps 231, 231' of the link chain 208 together in pairs so that these form stable chain links.

Figure 5:
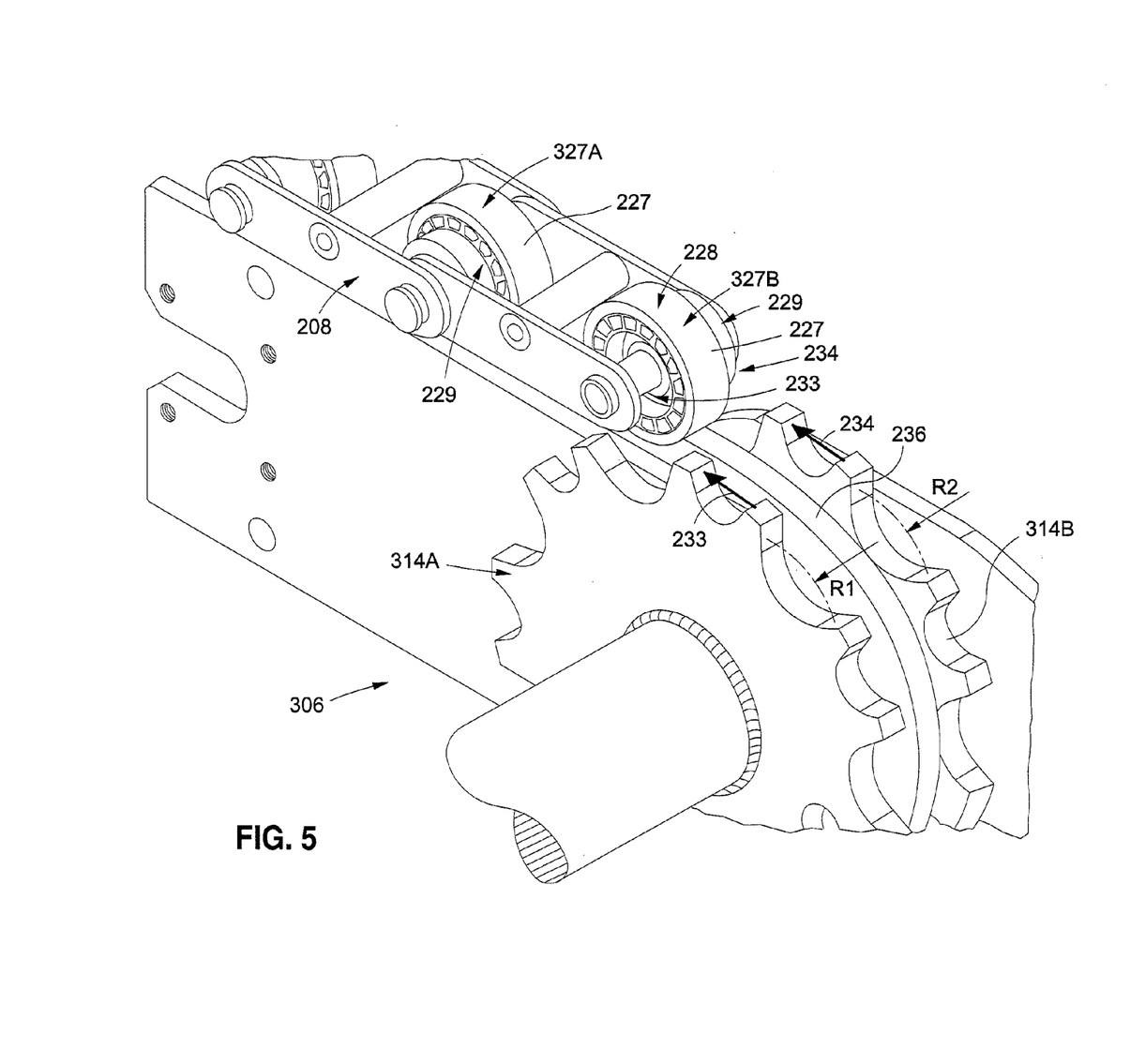
FIG. 5 shows, in three-dimensional view, a deflecting region of a moving walkway with two synchronous conveying chainwheels, a deflecting curve and a link chain, which has stepped chain rollers, in a second embodiment.

FIG. 5 shows a further embodiment of a deflecting region 306, wherein most of the components are the same as in FIG. 4. Accordingly, the same components have the same reference numerals and a repeat description of these components is dispensed with. As already shown in FIG. 4, the chain rollers 227 are arranged with respect to the stepped form thereof in alternation at the link chain 208, whereby a first part 327A of chain rollers 227 and a second part 327B of chain rollers 227, which serve as engagement points, are present. The difference from the embodiment of FIG. 4 consists in that the first part 327A of the chain rollers 227 is guided by the second diameters 229 thereof over a first conveying chainwheel 314A or first deflecting chainwheel, which is aligned with a first side track 223, and the second part of the chain rollers 327B is guided by the second diameters 229 thereof over a second conveying chainwheel 314B, which is aligned with the second side track 324 and which is arranged parallel to the first conveying chainwheel 314A and connected therewith to be secure against relative rotation, wherein the chain rollers 227 roll by the first diameter 228 thereof over a deflecting curve 236 arranged between the conveying chainwheels 314A, 314B.

Following the teaching of EP 1 876 135 B1 the first conveying chainwheel 314A can have a first pitch circle diameter R1 which is larger than a second pitch circle diameter R2 of the second conveying chainwheel 314B. In order to completely eliminate polygon effect, the deflecting curve 236 arranged between the first conveying chainwheel 314A and the second conveying chainwheel 314B serves merely for introduction or transfer of the chain rollers 227 to the first and second conveying chainwheels 314A, 314B.

All preceding explanations with respect to the two conveying chainwheels 314A, 314B obviously also analogously apply to a first deflecting chainwheel or a second deflecting chainwheel arranged parallel to the first deflecting chainwheel and connected therewith to be secure against rotation relative thereto.

Figure 6:
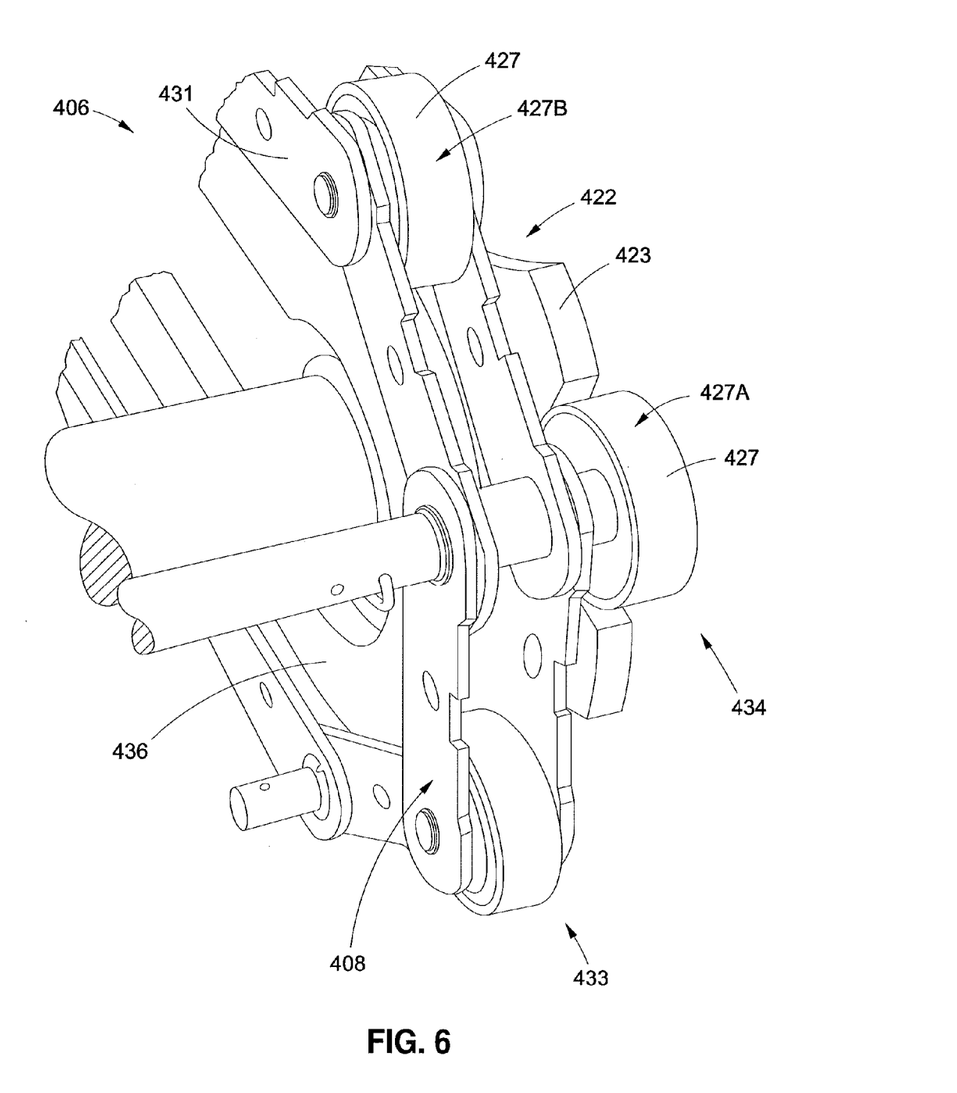
FIG. 6 shows, in three-dimensional view, a deflecting region of a moving walkway with a link chain, which has chain rollers arranged to be offset in alternation relative to one another.

FIG. 6 shows a further embodiment of a deflecting region 406 in three-dimensional view with a conveying chainwheel 423, a deflecting curve 436 and a link chain 408 with chain rollers 427 arranged at the link locations. The chain rollers 427 are divided into first chain rollers 427A and second chain rollers 427B. The second chain rollers 427B are arranged between the chain straps 431 of the link chain 408. The first chain rollers 427A are arranged at one side of the link chain 408 and offset relative to the second chain rollers 427B, so that the first chain rollers 427A roll on a first track 434 and the second chain rollers 427B roll on a second track 433 extending parallel to the first track 434. The deflecting curve 436 is aligned with the second track 433 and the conveying chainwheel 423 is aligned with the first track 434, so that in the deflecting region 406 the second chain rollers 427B roll on the deflecting curve 436. Only the first chain rollers 427A serve as engagement points 427 and engage in tooth gaps 422 of the conveying chainwheel 423 in the deflecting region 406. It is obvious in connection with the embodiment of FIG. 5 that also the embodiment illustrated in FIG. 6 can have two chainwheels, which are arranged parallel to one another and connected together to be secure against relative rotation, instead of one chainwheel and one deflecting curve. All preceding explanations with respect to the conveying chainwheel 423 obviously also analogously apply to a deflecting chainwheel.

Although in the description mention has been made primarily of chain rollers and the figures show chain rollers it is applicable to all embodiments that slide elements can also be arranged, instead of chain rollers or in combination therewith, as engagement points and/or guide elements at the link chain. All embodiments can be used not only in escalators with a step belt, but also in moving walkways with a plate belt. Step belts and plate belts usually have two encircling link chains which are arranged parallel to one another and which are connected together transversely to the running direction by the steps or plates arranged thereat. Conveying chainwheels or deflecting chainwheels are to be provided in the deflecting regions in correspondence with the described embodiments analogously for each of the two link chains. Since a deflecting chainwheel does not have to transmit torque it can also be replaced by a deflecting curve or by a deflecting arc or tensioning arc. Embodiments which comprise only conveying chainwheels designed in accordance with the invention and have deflecting curves or deflecting rails or deflecting guides in the first deflecting region are equally part of the present invention.

The present invention basically teaches that very wide teeth can be subdivided by the arrangement of further tooth gaps and thereby the service life of the deflecting chainwheels and conveying chainwheels can be increased in simple and economic manner. Insofar as the engagement spacings of the link chain are of sufficient length obviously also more than one tooth gap can be provided between two successive engagement spacings at the conveying chainwheel or deflecting chainwheel, so that the service life can not only be doubled, but also a multiplication of the service life can be achieved in correspondence with a multiplication of the tooth number. Such embodiments are equivalents in the sense of the invention.

The invention claimed is:

1. Escalator (1) with a step belt (7) or moving walkway with a plate belt (107), wherein the step belt (7) or plate belt (107) comprises at least one link chain (8, 108, 208, 408), which contains engagement points (27, 127, 227, 327A, 327B, 427) arranged in succession at theoretically equal engagement spacings (E) and at which link chain (8, 108, 208, 408) steps (9) or plates (109) are arranged, wherein the escalator (1) or the moving walkway has a first deflecting region (5) and a second deflecting region (6) with at least one conveying chainwheel (14, 114, 214, 314A, 314B), the at least one link chain (8, 108, 208, 408) is arranged to circulate between the deflecting regions (5, 6) and the engagement points (27, 127, 227, 327A, 327B, 427) engage in tooth gaps (22, 122, 222, 422) of the conveying chainwheel (14, 114, 214, 314A, 314B) and in a given case in tooth gaps (22, 122, 222, 422) of at least one deflecting chainwheel arranged in the first deflecting region (5), characterised in that at least one of the at least one conveying chainwheel (14, 114, 214, 314A, 314B) and the at least one deflecting chainwheel has a pitch circle (23) with a pitch (T) which is referred to the tooth gaps (22, 122, 222, 422) and which corresponds with half an engagement spacing (E) of the link chain (8, 108, 208, 408).

2. Escalator (1) or moving walkway according to claim 1, wherein at least one of the at least one conveying chainwheel (14, 114, 214, 314A, 314B) and/or deflecting chainwheel has an uneven tooth number.

3. Escalator (1) or moving walkway according to claim 1, wherein the at least one link chain (8, 108, 208, 408) contains chain rollers (27, 127, 227, 327A, 327B, 427A, 427B) which are arranged at link locations (26, 126) of the link chain (8, 108, 208, 408), which chain rollers (27, 127, 227, 327A, 327B, 427A, 427B) form the engagement points (27, 127, 227, 327A, 327B, 427) and which chain rollers (27, 127, 227, 327A, 327B, 427A, 427B) have a defined chain roller width.

4. Escalator (1) or moving walkway according to claim 3, wherein the chain rollers (427A, 427B) of the at least one link chain (408) are divided into first chain rollers (427A) and second chain rollers (427B) and the first chain rollers (427A) are arranged at the link chain (408) to be offset relative to the second chain rollers (427B) in alternating sequence so that the first chain rollers (427A) and the second chain rollers (427B) roll on tracks (433, 434) adjacent to one another.

5. Escalator (1) or moving walkway according to claim 4, wherein the first chain rollers (427A) are guided by way of the conveying chainwheel (423) and in a given case by way of the deflecting chainwheel and the second chain rollers (427B) are guided by way of a deflecting curve (436) aligned with the conveying chainwheel (423) or deflecting chainwheel.

6. Escalator (1) or moving walkway according to claim 5, wherein in the respective deflecting region (5, 6) the chain rollers (427A, 427B) lie on a base circle (RG⁻) of the conveying chainwheel (423) or of the deflecting chainwheel and the base circle radius (RG⁻) is smaller than a radius of the deflecting curve (436).

7. Escalator (1) or moving walkway according to claim 4, wherein the first chain rollers (427A) are guided by way of a first conveying chainwheel (314A) and the second chain rollers (427B) are guided by way of a second conveying chainwheel (314B) which is arranged parallel to the first conveying chainwheel (314A) and connected therewith to be secure against relative rotation.

8. Escalator (1) or moving walkway according to claim 7, wherein a first pitch circle diameter (R1) of the first conveying chainwheel (314A) is larger than a second pitch circle diameter (R2) of the second conveying chainwheel (314B).

9. Escalator (1) or moving walkway according to claim 3, wherein the chain rollers (127) of the at least one link chain (108) are formed to be stepped and have a first roller diameter (128) in a first half of their chain roller width and a second roller diameter (129), which is smaller with respect to the first roller diameter (128), in a second half of their chain roller width and the chain rollers (127) are arranged in alternation, referred to the stepped form thereof, between chain straps (131) of the link chain (108) so that a first part of the chain rollers (127) and a second part of the chain rollers (127) roll by the first roller diameters (128) thereof on a parallel first track (132) and second track (133) adjacent to one another.

10. Escalator (1) or moving walkway according to claim 9, wherein the conveying chainwheel (114) and, if present, the deflecting chainwheel have a base circle radius (RG), a width of the conveying chainwheel (114) and of the deflecting chainwheel corresponds with half the chain roller width of the stepped chain rollers (127) and these chainwheels (114) are aligned with the first track (132), and wherein a respective deflecting curve (136) aligned with the conveying chainwheel (114) or deflecting chainwheel and with the second track (133) is present so that in the deflecting regions (5, 6) the first roller diameter (128) lies in alternation at the base circle radius (RG) and at the deflecting curve (136).

11. Escalator (1) or moving walkway according to claim 10, wherein the conveying chainwheel (114) and in a given case the deflecting chainwheel have a base circle radius (RG) which is smaller than a radius of the deflecting curve (136).

12. Escalator (1) or moving walkway according to claim 3, wherein the chain rollers (227) of the at least one link chain (208) are formed to be stepped and have a first roller diameter (228) in a first half of their chain roller width and a second roller diameter (229), which is smaller with respect to the first roller diameter (228), in a second half of their chain roller width and the chain rollers (227) are arranged with the stepped form thereof alternating between chain straps (231, 231') of the link chain (208), wherein a first part (327A) of the chain rollers (227) and a second part (327B) of the chain rollers (227) roll by the first roller diameters (228) thereof on a common, centre track (232), the first part (327A) of the chain rollers (227) is aligned with respect to the second diameter (229) thereof with a first side track (233) extending parallel to the centre track (232) and the second part (327A) of the chain rollers (227) is arranged to be aligned with respect to the second diameter (229) thereof with a second side track (234) extending parallel to the centre track (232).

13. Escalator (1) or moving walkway according to claim 12, wherein the conveying chainwheel (214, 314A, 314B) and in a given case the deflecting chainwheel have a base circle radius (RG⁻), the width of the conveying chainwheel (214, 314A, 314B) or of the deflecting chainwheel corresponds with half the chain roller width of the stepped chain rollers (227) as well as is arranged to be aligned with one of the two side tracks (233, 234), and a respective deflecting curve (236) aligned with the conveying chainwheel (214, 314A, 314B) or deflecting chainwheel and the centre track (232) is present so that in the deflecting regions (5, 6) the first roller diameters (228) lie at the deflecting curve (236) and the second diameters (229) lie at one of the two side tracks (233) at the base circle radius (RG).

14. Escalator (1) or moving walkway according to claim 12, wherein the first part (327A) of the chain rollers (227) is guided by the second diameters (229) thereof by way of a first conveying chainwheel (314A) aligned with one of the two side tracks (233) and, if present, by way of a first deflecting chainwheel and the second part (327B) of the chain rollers (227) is guided by the second diameters (229) thereof by way of a second conveying chainwheel (314B), which is aligned with the second side track (234) and which is arranged parallel to the first conveying chainwheel (314A) and connected therewith to be secure against relative rotation, and a second deflecting chainwheel, which is arranged parallel to the first deflecting chainwheel and connected therewith to be secure against relative rotation, wherein the chain rollers (227) roll by the first diameter (228) thereof over a deflecting curve (236) arranged between the conveying chainwheels (314A, 314B) or deflecting chainwheels.

15. Escalator (1) or moving walkway according to claim 14, wherein the first conveying chainwheel (314A) or the first deflecting chainwheel has a first pitch circle diameter (R1) which is larger than a second pitch circle diameter (R2) of the second conveying chainwheel (314B) or of the second deflecting chainwheel.

* * * * *